(12) United States Patent
Lukacs et al.

(10) Patent No.: US 10,949,247 B2
(45) Date of Patent: *Mar. 16, 2021

(54) SYSTEMS AND METHODS FOR AUDITING A VIRTUAL MACHINE

(71) Applicant: Bitdefender IPR Management Ltd., Nicosia (CY)

(72) Inventors: Sandor Lukacs, Floresti (RO); Andrei V. Lutas, Cluj-Napoca (RO); Ionel C. Anichitei, Vatra Dornei (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,990

(22) Filed: Oct. 29, 2019

(65) Prior Publication Data

US 2020/0065131 A1 Feb. 27, 2020

Related U.S. Application Data

(63) Continuation of application No. 15/971,425, filed on May 4, 2018, now Pat. No. 10,489,187, which is a
(Continued)

(51) Int. Cl.
*G06F 9/455* (2018.01)
*G06F 9/50* (2006.01)
(Continued)

(52) U.S. Cl.
CPC ...... *G06F 9/45558* (2013.01); *G06F 9/44526* (2013.01); *G06F 9/5072* (2013.01); *G06F 11/30* (2013.01); *G06F 11/301* (2013.01); *G06F 11/302* (2013.01); *G06F 11/3051* (2013.01); *G06F 11/3093* (2013.01); *G06F 11/3409* (2013.01); *G06F 11/3466* (2013.01); *G06F 21/105* (2013.01); *G06F 21/56* (2013.01); *G06F 9/44521* (2013.01); *G06F 2009/45591* (2013.01); *G06F 2009/45595* (2013.01); *G06F 2201/865* (2013.01); *G06F 2221/034* (2013.01)

(58) Field of Classification Search
CPC .................................................. G06F 9/45558
See application file for complete search history.

(56) References Cited

U.S. PATENT DOCUMENTS 9,438,618 B1* 9/2016 Sultan ................. H04L 63/1433
2009/0241109 A1* 9/2009 Vandegrift .......... G06F 9/45533
718/1

(Continued)

*Primary Examiner* — Sisley N Kim
(74) *Attorney, Agent, or Firm* — Law Office of Andrei D Popovici, PC

(57) ABSTRACT

Described systems and methods enable performing software audits remotely and automatically, on a relatively large number of client systems (e.g., a corporate network, a virtual desktop infrastructure system, etc.) An audit engine executes on each client system, in a hardware virtualization configuration wherein the audit engine executes outside an audited virtual machine. When receiving an audit request from an audit server, some embodiments of the audit engine drop an audit agent into the audited virtual machine, and remove the audit agent upon completion of the audit.

17 Claims, 7 Drawing Sheets

Related U.S. Application Data continuation of application No. 15/045,979, filed on Feb. 17, 2016, now Pat. No. 9,965,313.

(60) Provisional application No. 62/274,902, filed on Jan. 5, 2016.

(51) Int. Cl.
*G06F 11/30* (2006.01)
*G06F 11/34* (2006.01)
*G06F 9/445* (2018.01)
*G06F 21/10* (2013.01)
*G06F 21/56* (2013.01)

(56) References Cited

U.S. PATENT DOCUMENTS

| | | | | |
|---|---|---|---|---|
| 2011/0125894 | A1* | 5/2011 | Anderson | G06F 21/31 709/224 |
| 2012/0066681 | A1* | 3/2012 | Levy | G06F 9/5027 718/1 |
| 2012/0304170 | A1* | 11/2012 | Morgan | G06F 9/45558 718/1 |
| 2014/0245444 | A1* | 8/2014 | Lutas | G06F 12/0882 726/24 |

* cited by examiner

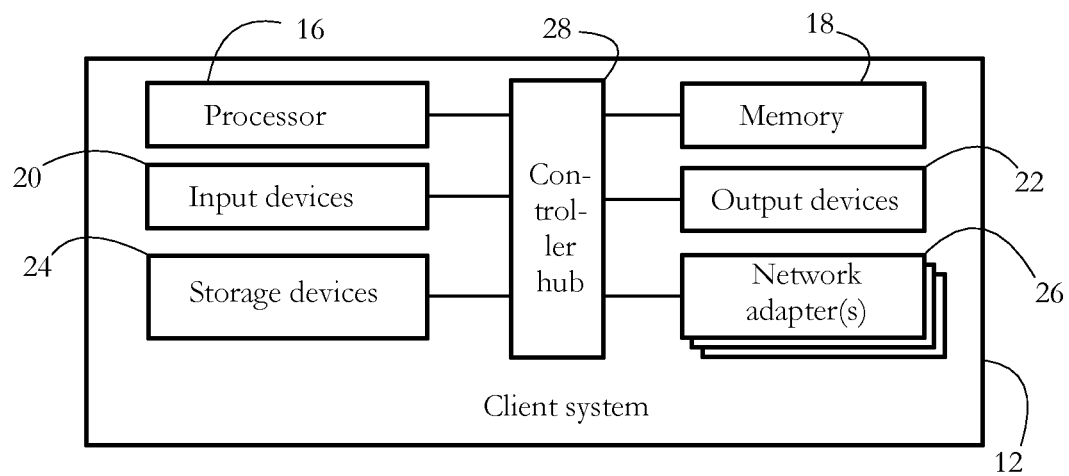
FIG. 2-A
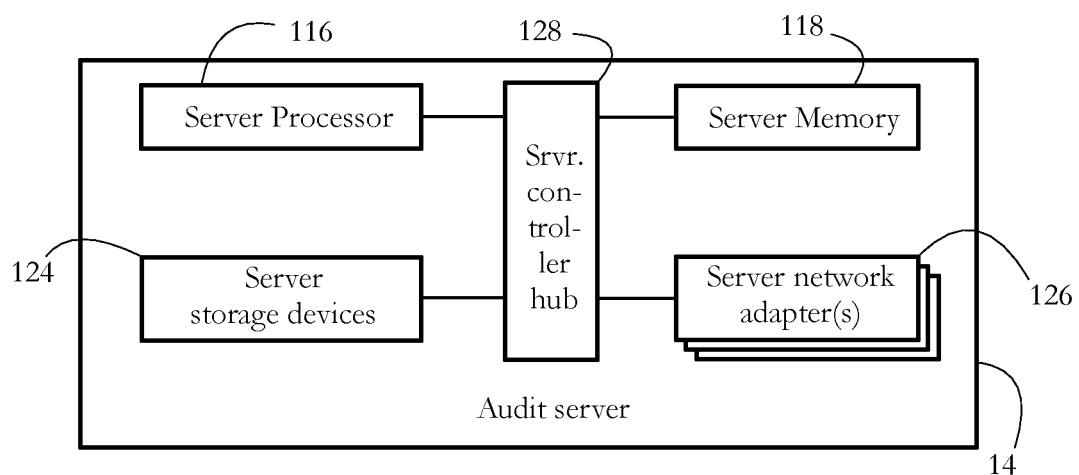
FIG. 2-B

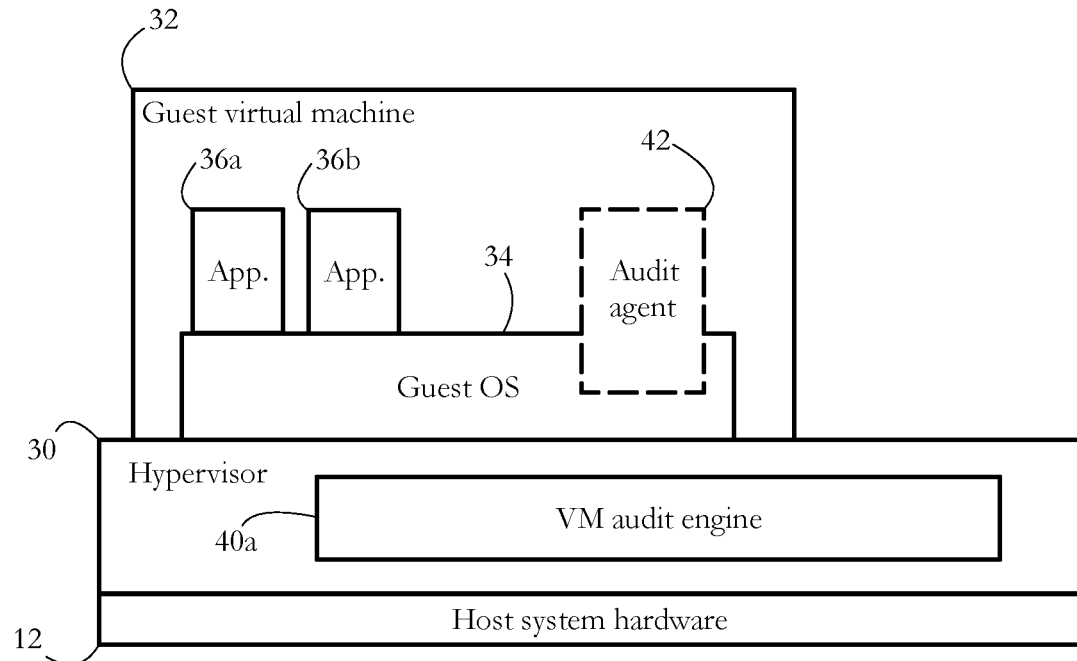
FIG. 3-A
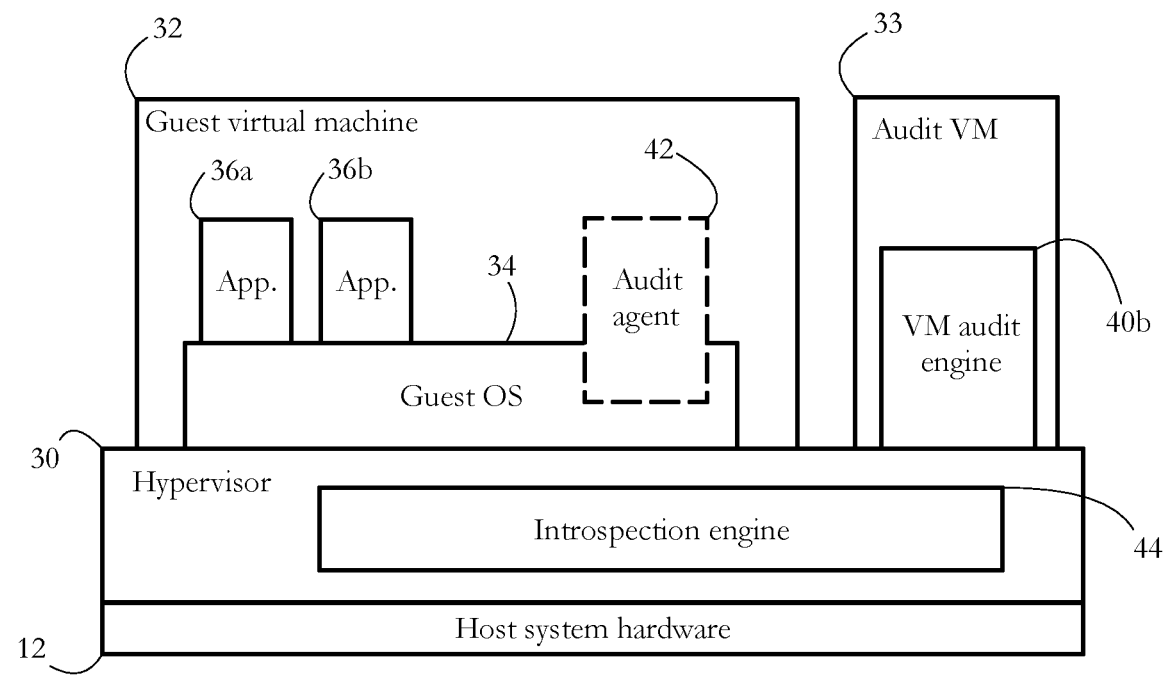
FIG. 3-B

SYSTEMS AND METHODS FOR AUDITING A VIRTUAL MACHINE

RELATED APPLICATIONS

This application is a continuation of U.S. patent application Ser. No. 15/971,425 filed May 4, 2018, entitled "Systems and Methods for Auditing a Virtual Machine," which is a continuation of U.S. patent application Ser. No. 15/945,079, filed Feb. 17, 2016, issued as U.S. Pat. No. 9,965,313, which in turn claims the benefit of the filing date of U.S. provisional patent application No. 62/274,902, filed on Jan. 5, 2016, the entire contents of which are incorporated by reference herein.

BACKGROUND

The invention relates to systems and methods for performing software audits, and in particular, to software audits performed in hardware virtualization configurations.

In the modern-day software-driven economy, the amount and complexity of hardware and software assets held by a company continuously increase. As employees move from using desktop computers to using mobile devices such as laptops, tablet computers and mobile phones, and as work becomes de-localized, keeping track of a company's hardware and software assets becomes a serious problem. For example, instead of using a single version of a software application across all company computers, companies nowadays typically use multiple versions of each application to account for the various hardware platforms and operating systems that the employees use in a modern mobile office. The situation is further complicated when applying software updates, when such updates may not be delivered uniformly to all computers and mobile devices.

Such increasing heterogeneity may complicate software licensing and service-level agreements. Moreover, the recent proliferation of application software used on mobile devices poses an increasing computer security risk. Malicious software and spyware may easily dissimulate among the plethora of legitimate applications and versions, thus exposing employees and the company to a risk of unauthorized access to proprietary data and to a loss of productivity, among others.

A further recent development changing the classical model of computing is hardware virtualization. In applications such as webserver farms and virtual desktop infrastructure (VDI), hundreds of virtual machines may execute concurrently on a single physical platform. Such virtual machines may be instantiated and/or removed dynamically, which further increases the heterogeneity of software executing at any one time on the respective physical platform.

Auditing software may be used to keep track of software installed and/or currently in execution on a computer system, for purposes such as licensing, digital rights management, application control, and computer security, among others. There is an increasing interest in developing auditing systems and methods particularly suited to modern virtualized environments.

SUMMARY

According to one aspect, a computer system comprises at least one hardware processor configured to execute a set of guest virtual machines (VM) and a VM audit engine outside the set of guest VMs. The VM audit engine is configured, in response to receiving an audit request from a remote audit server, to insert an audit agent into a target VM of the set of the guest VMs currently executing on the computer system. The VM audit engine is further configured, in response to the target VM executing the audit agent, to remove the audit agent from the target VM. The audit agent is configured to transmit a list of computer programs installed for execution within the target VM to the VM audit engine for further transmission to the audit server.

According to another aspect, a method of auditing a computer system comprises employing at least one hardware processor of the computer system to execute a virtual machine (VM) audit engine outside a set of guest VMs executing on the computer system. Executing the VM audit engine comprises, in response to receiving an audit request from a remote server, inserting an audit agent into a target VM of the set of guest VMs currently executing on the computer system. Executing the VM audit engine further comprises, in response to the target VM executing the audit agent, removing the audit agent from the target VM. The audit agent is configured to transmit a list of computer programs installed for execution within the target VM to the VM audit engine for further transmission to the audit server.

According to another aspect, a non-transitory computer readable medium comprises instructions which, when executed by at least one processor of a computer system, cause the computer system to form a virtual machine (VM) audit engine, the VM audit engine executing outside a set of guest VMs exposed on the computer system. The VM audit engine is configured, in response to receiving an audit request from a remote audit server, to insert an audit agent into a target VM of the set of the guest VMs currently executing on the computer system. The VM audit engine is further configured, in response to the target VM executing the audit agent, to remove the audit agent from the target VM. The audit agent is configured to transmit a list of computer programs installed for execution within the target VM to the VM audit engine for further transmission to the audit server.

BRIEF DESCRIPTION OF THE DRAWINGS

The foregoing aspects and advantages of the present invention will become better understood upon reading the following detailed description and upon reference to the drawings where:

FIG. 2-A illustrates an exemplary hardware configuration of an audited client system according to some embodiments of the present invention.

FIG. 2-B illustrates an exemplary hardware configuration of an audit server according to some embodiments of the present invention.

FIG. 3-A shows an exemplary virtual machine exposed by a hypervisor executing on an audited client system, and a VM audit engine executing outside the audited VM according to some embodiments of the present invention.

FIG. 3-B shows an alternative configuration wherein a guest virtual machine is audited by a separate audit VM executing on the client system according to some embodiments of the present invention.

DETAILED DESCRIPTION OF PREFERRED EMBODIMENTS

Figure 1:
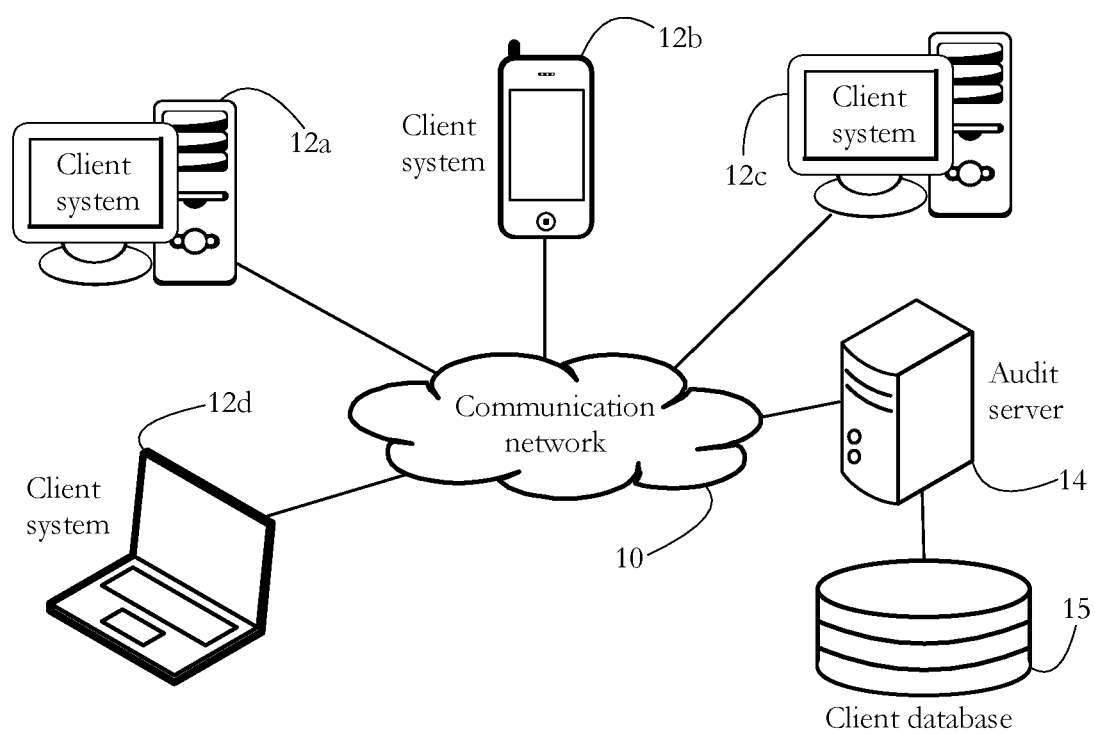
FIG. 1 illustrates an exemplary configuration wherein a plurality of client systems are audited at the request of a audit server, according to some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. Unless otherwise specified, a legitimate computer program is a computer program installed or otherwise configured for execution by a legitimate user of the respective computer system. In contrast, surreptitious malicious software (malware) and computer programs installed by an unauthorized intruder to the respective computer system are herein deemed illegitimate computer programs. A computer program is said to execute within or inside a virtual machine (or that the respective virtual machine executes the respective computer program) when the respective computer program executes on at least one virtual processor of the respective virtual machine. A process is an instance of a computer program, such as an application or a part of an operating system, and is characterized by having at least an execution thread and a virtual memory space assigned to it, wherein a content of the respective virtual memory space includes executable code. Unless otherwise specified, a page represents the smallest unit of virtual memory that can be individually mapped to a physical memory of a host system. Unless otherwise specified, a register represents a storage component integrated with or forming part of a processor, and distinct from random-access memory (RAM). A tunnel is a virtual point-to-point connection between two entities connected to a communication network. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more microprocessors) programmed to perform the methods described herein, as well as computer-readable media encoding instructions to perform the methods described herein.

The following description illustrates embodiments of the invention by way of example and not necessarily by way of limitation:

FIG. 1 shows an exemplary configuration according to some embodiments of the present invention, wherein a plurality of client systems 12*a-d* are audited remotely at the request of an audit server 14. Exemplary client systems 12*a-d* include personal computer systems, mobile computing platforms (laptop computers, tablets, mobile telephones), entertainment devices (TVs, game consoles), wearable devices (smartwatches, fitness bands), household appliances, and any other electronic device comprising a processor and a memory and capable of operating a hardware virtualization platform. Client systems 12*a-d* are interconnected via a communication network 10, such as a corporate network or the Internet. Parts of network 10 may include a local area network (LAN).

Audit server 14 is communicatively coupled to client systems 12*a-d* and collaborates with each client system 12*a-d* to perform an audit of the respective client system. Exemplary auditing activities include, among others, an identification of software assets and a verification of the respective software assets with respect to licenses, usage, and rights. The granularity of such auditing may vary from a relatively high level (e.g., determining what applications/versions are installed on a client system), to an in-depth audit including, for instance, determining whether the software executing on a client system uses a particular version of a critical component (e.g., driver, patch, anti-malware module), when each component was installed or accessed, how much hardware resources a single application uses, etc. Other exemplary auditing activities include, among others, determining which software components (applications, processes, drivers, etc.) are currently in execution on a client system at the moment of the audit, determining the current state of the processor of the respective client system, determining the current level of resource usage (e.g., CPU, memory, disk, network, etc.), and determining a set of configuration parameter values/settings of the OS, of various applications, user settings, etc., of the respective client system.

Server 14 generically represents a set of interconnected computing systems, which may or may not be in physical proximity to each other. In some embodiments, audit server 14 is configured to access a client database 15. In an exemplary client database 15, each entry is associated with an audited client system 12*a-d*, and may include a content of a set of audit reports (see below) received from the respective client system. Each entry may be further time-stamped with an indicator of a time of receipt for each audit report received from the respective client system. Each entry of database 15 may comprise audit data determined for the respective client system, including, for instance, indicators of a hardware configuration of the respective client system, an indicator of the type and version of the operating system (OS), an indicator of a set of legitimately installed applications or other software components (e.g., drivers, patches), an indicator of a set of software components (applications, processes, drivers, etc.) currently loaded and/or in execution at the time of the audit, a set of parameters indicating various OS, application and/or user setting for the respective client system, and a set of indicators of resource usage (e.g. CPU, memory, disk, etc.) at the time of the audit. Audit data may further include time indicators indicating when each listed software component was installed and/or the latest moment each listed component was accessed or modified.

FIG. 2-A shows an exemplary hardware configuration of a client system 12, such as systems 12a-d in FIG. 1. For simplicity, the illustrated client system is a computer system; the hardware configuration of other client systems such as mobile telephones, watches, etc., may differ somewhat from the illustrated configuration. Client system 12 comprises a set of physical devices, including a hardware processor 16 and a memory unit 18. Processor 16 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 16 in the form of a sequence of processor instructions (e.g. machine code or other type of encoding). Memory unit 18 may comprise volatile computer-readable media (e.g. DRAM, SRAM) storing instructions and/or data accessed or generated by processor 16.

Input devices 20 may include computer keyboards, mice, and microphones, among others, including the respective hardware interfaces and/or adapters allowing a user to introduce data and/or instructions into client system 12. Output devices 22 may include display devices such as monitors and speakers among others, as well as hardware interfaces/adapters such as graphic cards, allowing client system 12 to communicate data to a user. In some embodiments, input devices 20 and output devices 22 may share a common piece of hardware, as in the case of touch-screen devices. Storage devices 24 include computer-readable media enabling the non-volatile storage, reading, and writing of software instructions and/or data. Exemplary storage devices 24 include magnetic and optical disks and flash memory devices, as well as removable media such as CD and/or DVD disks and drives. The set of network adapters 26 enables client system 12 to connect to a computer network and/or to other devices/computer systems. Controller hub 28 represents the plurality of system, peripheral, and/or chipset buses, and/or all other circuitry enabling the communication between processor 16 and devices 18, 20, 22, 24, and 26. For instance, controller hub 28 may include a memory controller, an input/output (I/O) controller, and an interrupt controller, among others. In another example, controller hub 28 may comprise a northbridge connecting processor 16 to memory 18 and/or a southbridge connecting processor 16 to devices 20, 22, 24, and 26.

FIG. 2-B shows an exemplary hardware configuration of audit server 14 according to some embodiments of the present invention. Server 14 comprises at least one hardware processor 116 (e.g., microprocessor, multi-core integrated circuit), a physical memory 118, and a set of server network adapters 126. Adapters 126 may include network cards and other communication interfaces enabling audit server 14 to connect to communication network 10. In some embodiments, server 14 further comprises input, output and storage devices, which may be similar in function to input, output, and storage devices 20, 22, and 24, respectively.

In some embodiments, client system 12 is configured to expose a set of virtual machines, for instance as illustrated in FIGS. 3-A-B. A virtual machine (VM) emulates an actual physical machine/computer system, using any of a variety of techniques known in the art of hardware virtualization. In some embodiments, a hypervisor 30, also known in the art as a virtual machine monitor (VMM), executes on client system 12 and is configured to create or enable a plurality of virtualized devices, such as a virtual processor and a virtual memory management unit, and to expose such virtualized devices to software, in place of the real, physical devices of client system 12. Such operations are commonly known in the art as exposing a virtual machine. Hypervisor 30 may further enable multiple virtual machines to share the hardware resources of host system 12, so that each VM operates independently and is unaware of other VMs executing concurrently on client system 12. Examples of popular hypervisors include the VMware vSphere™ from VMware Inc. and the open-source Xen hypervisor, among others.

In the exemplary configurations illustrated in FIGS. 3-A-B, a guest VM 32 executes a guest operating system (OS) 34, and a set of applications 36a-b. Guest OS 34 may comprise any widely available operating system such as Microsoft Windows®, MacOS®, Linux®, iOS®, or Android™, among others, providing an interface between applications executing within VM 32 and the virtualized hardware devices of VM 32. Applications 36a-b generically represent any user application, such as word processors, spreadsheet applications, graphics applications, browsers, social media, and electronic communication applications, among others.

In the embodiment illustrated in FIG. 3-A, a VM audit engine 40a executes outside of guest VM 32, at the processor privilege level of hypervisor 30 (e.g., root level or ring −1). VM audit engine 40a is configured to perform an audit of guest VM 32. In some embodiments, such an audit comprises dropping an audit agent 42 into the audited VM, as described in detail below, and removing agent 42 from the audited VM once the audit is complete.

In an alternative embodiment illustrated in FIG. 3-B, hypervisor 30 is configured to expose an audit VM 33 separate from all audited guest VMs, wherein audit VM 33 may execute concurrently with guest VM(s) 32. Some embodiments of audit VM 33 comprise a lightweight, minimal operating system (e.g., a customized version of a Linux® OS), and are configured to execute a VM audit engine 40b configured to perform an audit of guest VM 32. The virtual environments of guest VM 32 and audit VM 33 may be isolated from each other using any method known in the art of virtualization, to ensure that malicious software executing within guest VM 32 cannot infect or otherwise interfere with software executing within audit VM 33. In the embodiment of FIG. 3-B, an introspection engine 44 executes outside guest VM 32 and audit VM 33, at the processor privilege level of hypervisor 30. In the exemplary embodiment of FIG. 3-A, some of the activities of introspection engine 44 may be performed at least in part by VM audit engine 40a.

Although FIGS. 3-A-B were drafted to show only one guest VM 32 executing on client system 12, some embodiments may be configured to perform audits in a client system running multiple VMs. Typical applications of such virtualization platforms are server farms, wherein a single computer system may host hundreds of distinct webserver VMs operating concurrently. Another typical application belongs to the category of virtual desktop infrastructure (VDI), wherein a user's applications execute on a first computer system, while the user interacts with the respective applications via a second computer system (terminal). In typical VDI configurations, a virtual machine running the requested application is instantiated on-demand on the first computer system, which may end up executing hundreds of such VMs for multiple remote users. In such embodiments, a single VM audit engine 40a-b may perform audits of multiple VMs, or of all VMs executing on the respective client system. For instance, audit engine 40a-b may drop an audit agent inside each of the respective guest VMs. In one such example, VM audit engine 40a-b may select a type of audit agent and adjust the agent dropping procedure according to hardware and/or software specifications of each VM, for instance according to a type of OS executing within the respective VM. In some embodiments, VM audit engine 40a-b may be instructed by server 14 to selectively perform an audit of a particular target VM, or of a selected subset of VMs executing on the respective client system.

In some embodiments, introspection engine 44 (FIG. 3-B) is configured to detect various events occurring during execution of software within the audited guest VM, and to exchange such information with other auditing software (e.g., agent 42 and/or engine 40a-b). Exemplary events detected by introspection engine 44 include, for instance, a processor exception and/or interrupt, an attempt to execute a particular function of guest OS 34, a change of processor privilege (e.g., a system call), an attempt to access (read from, write to, and/or execute from) a particular memory location, etc. Introspection engine 44 may be further configured to determine memory addresses of various software components executing within guest VM 32, as further described below.

Several methods for detecting such events are known in the art. In one such example, introspection engine 44 may collaborate with hypervisor 30 to set memory access permissions using a second-level address translation mechanism (e.g. extended page tables—EPT on Intel® platforms, rapid virtualization indexing—RVI on AMD® platforms). When an attempt to access a particular memory page violates an access permission set for the respective memory page, the respective attempt may trigger a processor event, such as an exception or a virtual machine exit event (VMExit on Intel® platforms). As a result of the processor event, processor 16 may switch to executing an event handler routine within introspection engine 44, which allows engine 44 to detect the occurrence of the respective event. Such mechanisms may detect, for instance, a call to a particular function, by marking the memory page containing a part of the respective function as non-executable.

For simplicity and without loss of generality, the following description will focus on an exemplary embodiment configured as illustrated in FIG. 3-A. A skilled artisan will understand that the described systems and methods may be adapted to other configurations, and in particular to the exemplary configuration of FIG. 3-B. In the following description, the VM audit engine(s) will be generically labeled 40, which may represent either audit engine 40a or audit engine 40b, depending on the chosen configuration.

Figure 4:
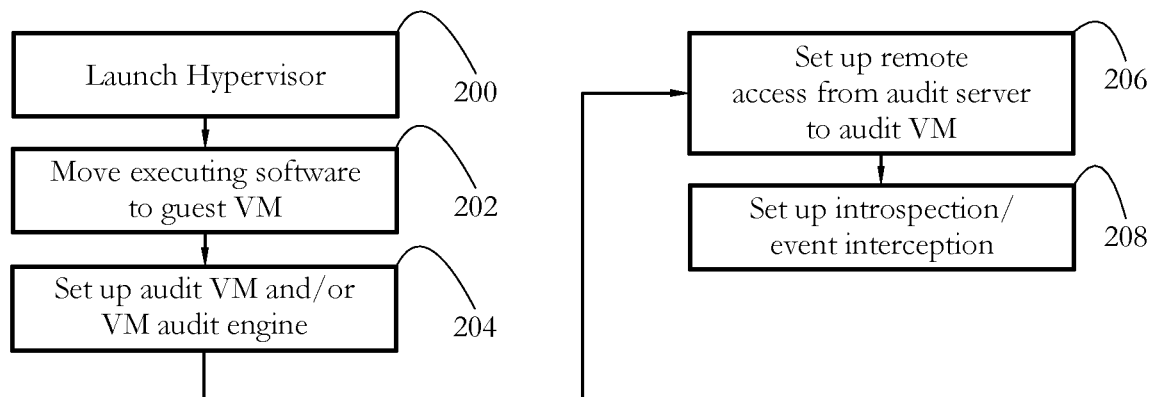
FIG. 4 shows an exemplary sequence of steps carried out by an audit installer application to set up auditing of a client system according to some embodiments of the present invention.

FIG. 4 shows an exemplary sequence of steps performed to set up auditing of a client system according to some embodiments of the present invention. In a typical scenario of auditing a corporate network, a network administrator may install an audit application on each client system 12a-d.

The audit application may comprise various components, such as VM audit engine 40, introspection engine 44, etc. The illustrated sequence of steps may be carried out, for instance, by an installer utility of the respective audit application. When installed on a client system not currently operating in a hardware virtualization configuration, the audit software may first take over processor 16 at the most privileged level (e.g., VMXRoot on Intel® platforms supporting virtualization, otherwise commonly known and root mode or ring −1), and install hypervisor 30. Hypervisor 30 may then expose guest VM 32 and move all software previously executing on the respective client system to execute within guest VM 32. Hypervisor 30 may further set up VM audit engine 40 and/or introspection engine 44. When installed on a hardware virtualization platform already running multiple virtual machines, steps 200-202 may be omitted.

In some embodiments, a step 206 may set up a remote access from audit server 14 to VM audit engine 40. Such access may enable audit server to send instructions directly to an audited client system 12, automatically or assisted by a human operator. Such instructions may, for instance, instruct VM audit engine 40 to perform a particular kind of audit, to inspect guest VM for the presence and/or characteristics of a particular software component, to determine a current state of processor 16 (e.g., the contents of a set of processor registers), to read a set of parameter settings for guest OS 34 or other software, etc. In one exemplary embodiment, step 206 may configure a tunnel (i.e., a point-to-point communication link) between server 14 and hypervisor 30, and/or between server 14 and audit VM 33. Exemplary tunnels may be set up according to virtual private networking (VPN) and/or secure shell (SSH) protocols and methods. Once such a tunnel is set up, it can be used by server 14 to send audit requests and/or other instructions to VM audit engine 40.

In a further step 208, the audit installer may configure introspection and/or event interception from the level of hypervisor 30. Step 208 may comprise, for instance, setting access permissions to some memory pages used by the audited guest VM so that an attempt to access the respective page will trigger a processor event (e.g., a VM Exit event) enabling VM audit engine 40 or introspection engine 44 to detect the occurrence of an event (e.g., a system call) within audited guest VM 32. In some embodiments, step 208 may further set up a signaling and/or communication mechanism between components executing within the audited VMs (e.g., audit agents 42) and components executing outside the respective VM (e.g. audit engine 40, introspection engine 44). Such communication or signaling may use any method known in the art of hardware virtualization. In one example, two software components may transmit data between each other via a section of physical memory shared by the two software components. To send data from a first component executing inside a VM to a second component executing outside the respective VM, the first software component may write the data to the shared memory section and then issue a privileged processor instruction (e.g., VMCALL on Intel® platforms), thus causing a VM exit event. VM exit events, such as VMExit on Intel® platforms, switch processor 16 from executing the first software component to executing a handler routine, which may be part of the second software component. Thus, the second component executing outside the respective VM may be notified that the first component is trying to transmit data. Conversely, to send data from the second component to the first component, the second component may write the data to the shared memory section and then inject an interrupt into the respective VM. The interrupt will be handled by an interrupt handler executing within the respective VM (for instance, by the first software component). Thus, the first component may detect that the second component is trying to transmit data. In some embodiments, step 208 comprises registering the appropriate software components as handlers for various processor events, to enable the communication mechanism described above.

Figure 5:
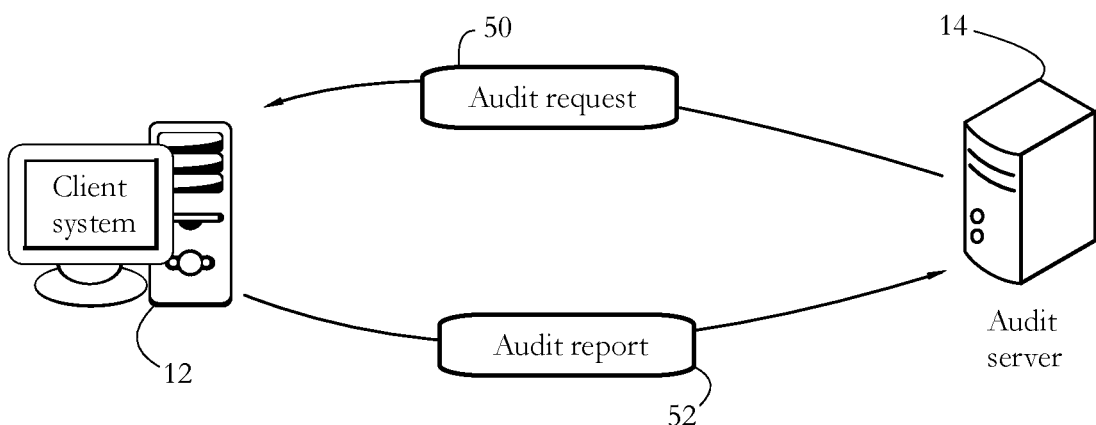
FIG. 5 shows an exemplary data exchange between an audited client system and the audit server according to some embodiments of the present invention.

FIG. 5 shows an exemplary data exchange between audit server 14 and an audited client system according to some embodiments of the present invention. Server 14 may send an audit request 50 to client system 12, request 50 instructing VM audit engine 40 to perform an audit of client system 12. In some embodiments, audit request 50 includes an indicator of a type of audit, for instance of a type of audit operation to be performed on client system 12: to list all legitimate applications, to determine current OS settings, etc. Another exemplary audit request 50 comprises an indicator of a target virtual machine currently executing on client system 12; such an audit request may instruct audit engine 40 to selectively perform an audit of the target VM. Yet another exemplary audit request 50 may include an indicator of a specific software component (e.g., Microsoft Word®, a particular driver, etc.) Such a request may instruct engine 40 to determine, among others, whether the respective software component is legitimately installed on the respective client system, which version of the respective software component is installed, whether the respective software component is currently loaded in memory/executing, when the respective software component was used most recently, etc. Another exemplary audit request 50 may instruct engine 40 to determine a current level/amount/percentage of hardware resources (e.g., processor, storage, memory) used by the target VM or by a particular software component executing within the target VM.

Audit request 50 may include an identifier of a target guest VM executing on the audited client system. Such a request may instruct audit engine 40 to perform a selective audit of the respective guest VM. Other requests 50 may instruct audit engine to perform an audit of all guest VMs currently executing on the audited client system.

Audit requests 50 may be sent out according to a schedule, or in response to an action of a network administrator. Audits requests 50 may be sent out uniformly to all client systems 12a-d, or may be tailored specifically to each audited client system. In some embodiments, an audit request may be triggered by an event occurring on the respective client system, or in response to an event occurring elsewhere on communication network 10. In response to carrying out the requested audit, VM audit engine(s) 40a-b may send an audit report 52 to server 14. Report 52 comprises a result of the respective audit activities, for instance a list of installed software components, a set of current configuration settings of the respective client system, etc.

Figure 6:
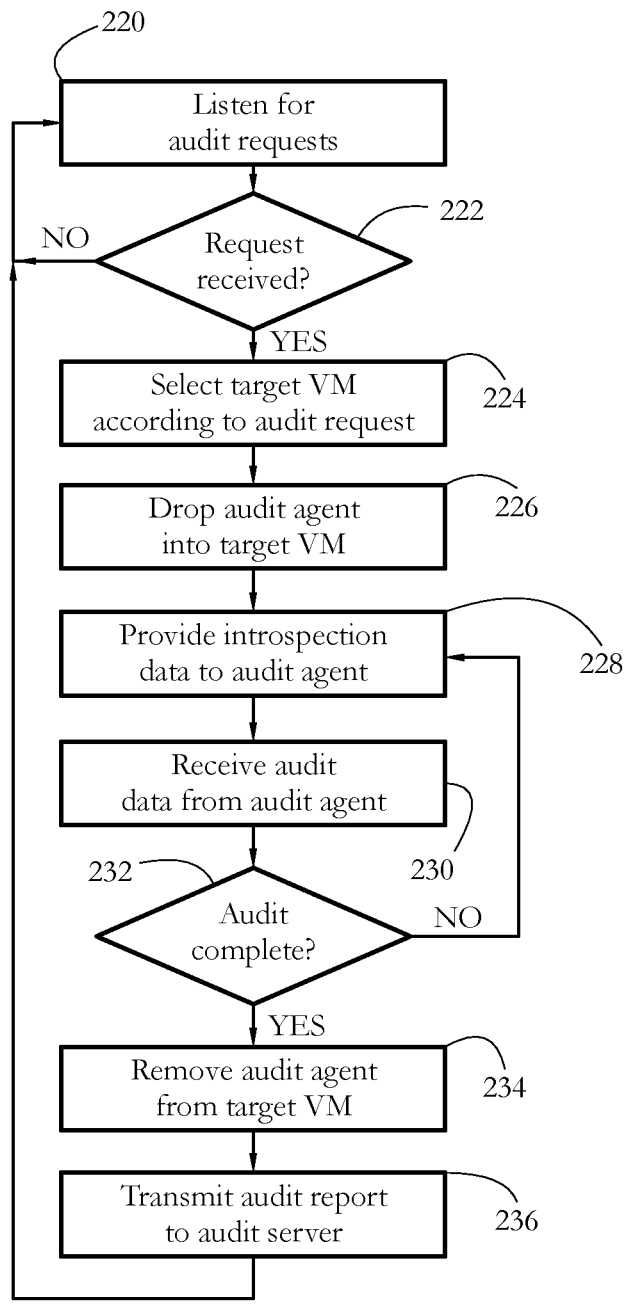
FIG. 6 shows an exemplary sequence of steps performed by a VM audit engine according to some embodiments of the present invention.

FIG. 6 shows an exemplary sequence of steps performed by VM audit engine 40 according to some embodiments of the present invention. Engine 40 may listen for audit requests 50 from server 14. When request 50 is received, engine 40 may select a target VM for auditing according to audit request 50, and drop an audit agent into the target guest VM (e.g., guest VM 32 in FIGS. 3-A-B).

The agent may be crafted according to a type of the audited guest VM, e.g., according to a type of guest OS 34 currently executing within the audited VM. OS type may comprise a name indicator, such as Windows®, and a version indicator, such as 7, Home, or Enterprise, among others. In some embodiments, audit engine 40 identifies the type of OS according to a content of a model-specific register (MSR) of the respective guest VM, or to a content of a section of memory pointed to by the respective MSR. In some embodiments, engine 40 may determine the name of OS according to data being written to such MSRs by software executing within the audited VM. For instance, engine 40 may intercept instructions to write to a SYSENTER or to a SYSCALL MSR, and determine the type of OS currently executing, or currently initializing, according to a parameter of such a write instruction. Other exemplary registers, which may provide information about the OS name include control registers, interrupt descriptor table (IDT), and global descriptor table (GDT), among others. For identifying OS type according to MSR writes, introspection engine 40 may further use pattern matching against a pre-determined library of fast system-call handlers specific to each OS (e.g., system calls handled according to a content of the SYSCALL or SYSENTER MSRs). Such fast system-call libraries may be provided with audit engine 40 and/or introspection engine 44, and may be kept up to date via periodic or on-demand software updates.

In some embodiments, a version indicator (such as a release name, build number, etc.) may be obtained by parsing certain kernel data structures specific to the respective type of OS. Exemplary data structures allowing identification of the OS version are certain export symbols of the Linux® kernel or certain exported symbols of the Windows® kernel, such as the NtBuildNumber, among others.

Having dropped audit agent 42 into the target guest VM, a sequence of steps 228-230-232 may be repeated in a loop until the audit is complete. While the audit proceeds, VM audit engine 40 may exchange data (e.g., memory addresses of various software components, various results of the audit) with audit agent 42. Such messaging between components executing within and outside a virtual machine may be carried out using any method known in the art of virtualization (for instance via a section of memory shared between audit engine 40 and audit agent 42, as described above). When the audit is complete, a step 234 erases the audit agent from the audited VM, for instance by erasing a section of memory containing a driver loader (more details below). In a further step 236, audit engine 40 formulates and sends audit report 52 to audit server 14.

Figure 7:
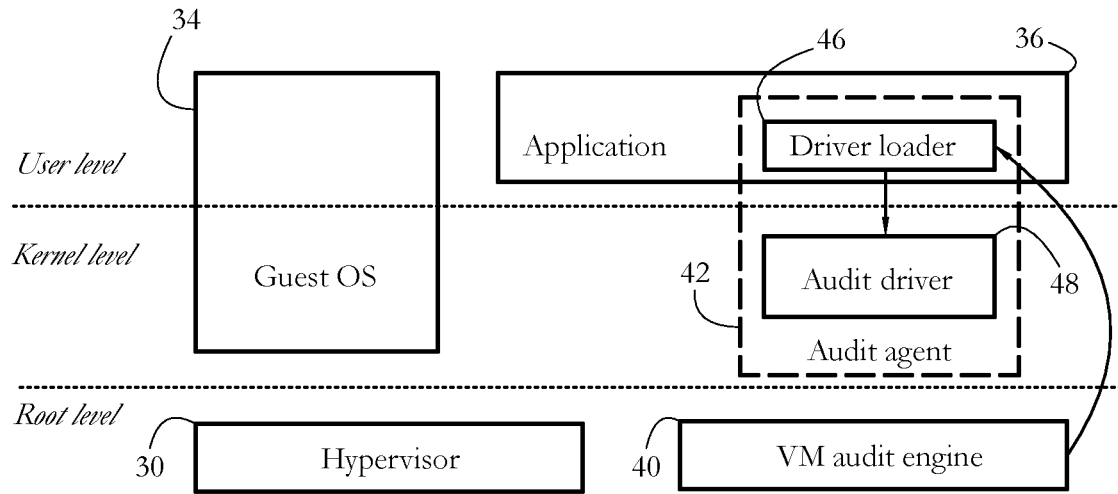
FIG. 7 shows exemplary components of an audit agent executing at various processor privilege levels according to some embodiments of the present invention.

FIG. 7 shows exemplary components of audit agent 42 from a perspective of processor privilege levels (e.g., privilege rings). In some embodiments, audit agent 42 comprises a driver loader 46 and an audit driver 48. Driver loader 46 may be injected by VM audit engine 40 into a running application 36, such as applications 36a-b in FIGS. 3-A-B. Driver loader 46 may therefore execute at the privilege level of application 36, typically in ring 3 (user mode or user level of processor privilege). In some embodiments, driver loader 46 loads and launches audit driver 48 onto guest VM 32, driver 48 typically executing at the processor privilege level of guest OS 34 (e.g., ring 0, kernel mode, or kernel level). Audit driver 48 may then carry out audit operations within guest VM 32. When the audit is complete, loader 46 or VM audit engine 40 may remove driver 48 from guest VM 32, for instance by erasing a memory section containing driver 48. An alternative embodiment does not use driver loader 46, but instead injects code (e.g., audit agent 42) directly into the kernel of guest OS 34. In such embodiments, agent 42 may execute entirely in ring 0 (kernel mode).

Figure 8:
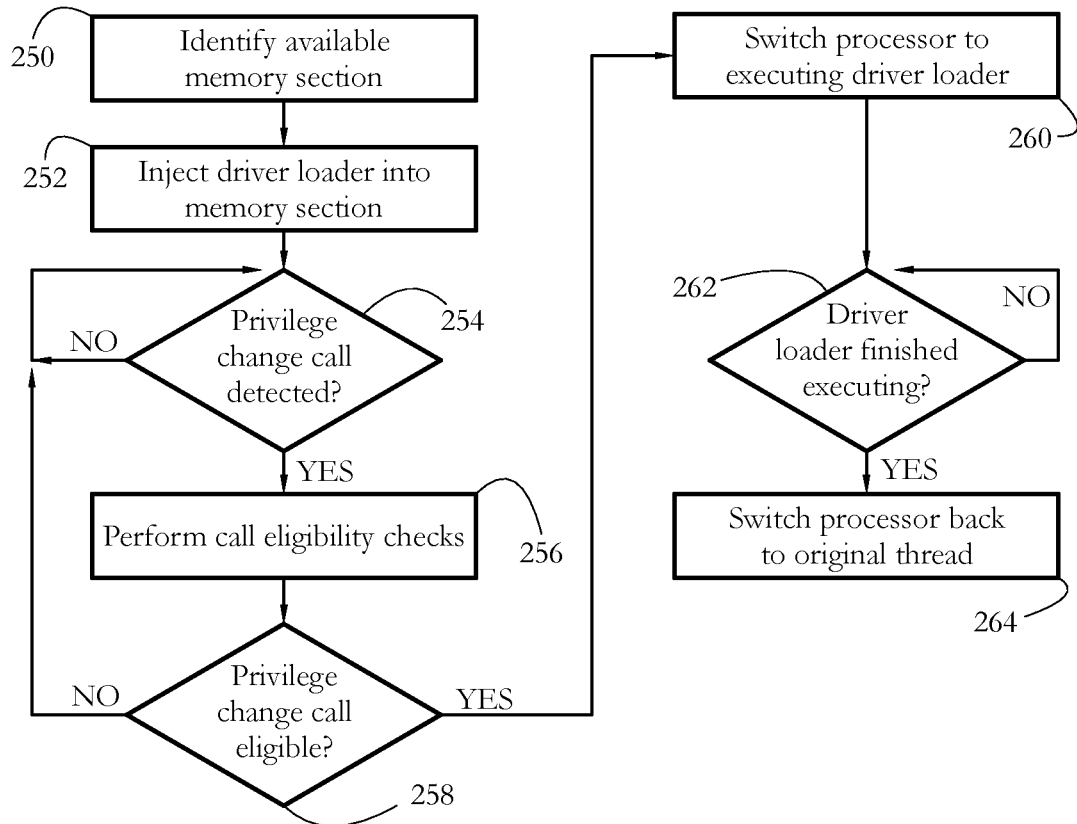
FIG. 8 shows an exemplary sequence of steps performed by the VM audit engine to drop the audit agent into the audited VM according to some embodiments of the present invention.

Dropping a software component into a virtual machine may be achieved using various methods known in the art. FIG. 8 shows an exemplary sequence of steps performed by VM audit engine 40 to drop agent 42 inside guest VM 32 (step 226 in FIG. 6) according to a preferred embodiment of the present invention. In a step 250, VM audit engine 40 identifies a section of memory suitable for injecting driver loader 46. In some embodiments, driver loader 46 is crafted to be as small as possible, e.g., much less than a memory page, so that it can be safely dissimulated among existing data structures without having to use the OS's memory allocation facilities (using these may make loader 46 and/or driver 48 discoverable by other software including malware executing within guest VM 32).

In one example, VM audit engine 40 may search for a memory section suitable to receive driver loader 46 within the padding space typically reserved by guest OS 34 between driver sections. Such padding space exists because some operating systems such as Windows® allocate memory such that each distinct section of an object is aligned to a page boundary. When a section does not occupy an entire memory page, the remaining memory space within the respective page is padded with dummy data (e.g., zeroes). In such embodiments, searching for a suitable memory space to accommodate driver loader 46 may comprise scanning a memory page allocated to a driver of guest OS 34 for such dummy data.

In another example, engine 40 may intercept an attempt by the OS to allocate memory for a small object (e.g., a driver), the respective object smaller than a memory page. Instead of allocating the required amount of memory, engine 40 may force guest OS 34 to allocate a full memory page (e.g., 4 kB) to the respective object, and use the remaining space within the respective memory page to host driver loader 46. To intercept such a memory allocation attempt, some embodiments of audit engine 40 and/or introspection engine 44 may detect an attempt to execute a native OS memory management function, such as KeAllocatePoolWithTag in Windows®. To determine memory addresses where such functions reside in the memory of the respective guest virtual machine 32, audit engine 40 may access certain data structures, such as the exported functions tables of the kernel binary images (e.g. Portable Executable in Windows®, Executable and Linkable Format in Linux®). The type of object currently being allocated via may be determined according to the allocation tag of the intercepted call. For instance, in Windows®, a 'Driv' tag indicates a driver object.

In yet another example, step 250 comprises mapping an unused memory page to the memory space of an executing process, such as application 36 in FIG. 7. Having identified a suitable section of memory to host driver loader 46, in a step 252, VM audit engine 40 may inject loader 46 into the respective section of memory.

Next, some embodiments of audit engine 40 may wait for a currently executing process (such as application 36) to attempt a change of processor privilege, for example by issuing a system call such as SYSCALL on AMD® platforms, or SYSENTER on Intel® platforms. Intercepting a system call from outside the respective VM may be achieved in several ways. In one example, engine 40 may reset the value of a processor register of the virtual processor currently executing the thread attempting the system call. Examples of such processor registers include the IA32_LSTAR and IA32_SYSENTER_EIP registers on Intel® platforms. Such register manipulation will subsequently cause a fault when a system call is attempted; the respective fault may be detected by VM audit engine 40 or introspection engine 44. In another example, engine 40 may place a redirection hook on the code page that contains a system call handler of guest OS 34.

In some embodiments, when a system call is intercepted, a step 256 carries out a set of eligibility checks, to determine whether the context of the respective system call allows for a safe injection of driver loader 46. In one example wherein interception of system calls is achieved via hooking of the system call handler, eligibility checks may comprise determining whether the current stack is a user stack or not. An attempt to inject code when the stack is a user stack may compromise the system, because anything that resides in user mode is untrusted for the kernel. In addition, other threads may sniff data from a user stack, and may even be able to even attack driver loader 46. In some embodiments, determining whether the stack is a user stack comprises determining the privilege level of a stack segment descriptor. Another eligibility check may determine whether interrupts are currently enabled. Driver loader 46 may have to execute some processor instructions, which require interrupts to be enabled. Yet another eligibility check may determine the current interrupt request level (IRQL). Some embodiments may require, for instance, that the current IRQL be equal to 0 to be able to carry out the operations of driver loader 46.

When the system call meets eligibility requirements, in a step 260, audit engine 40 may suspend execution of the thread which issued the respective system call and switch processor 16 to executing driver loader 46. When loader 46 has finished executing, audit engine 40 may switch processor 16 back to executing the original thread (e.g., application 36).

Figure 9:
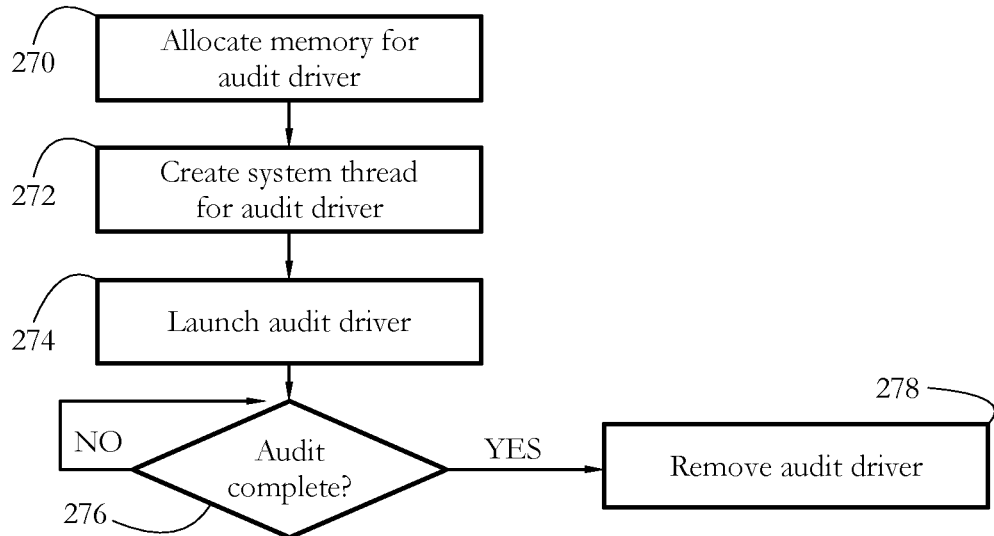
FIG. 9 illustrates an exemplary sequence of steps performed by the driver loader of the audit agent according to some embodiments of the present invention.

FIG. 9 shows an exemplary sequence of steps performed by driver loader 46 according to some embodiments of the present invention. To allocate memory for audit driver 48 and/or to create a thread for driver 48, some embodiments may call the dedicated functions of guest OS 34, for instance ExAllocatePoolWithTag and PsCreateSystemThread in Windows® (similar functions exist in other OSs, e.g. Linux®). In an embodiment wherein driver loader 46 is required to have a small memory footprint, the addresses of such OS functions may be provided to loader 46 by VM audit engine 40, e.g., via a messaging mechanism as described above. In such embodiments, driver loader 46 may not actually write driver 48 to the allocated memory. Instead, loader 46 may communicate to VM audit engine 40 an address of the allocated section of memory, while the actual writing is carried out by audit engine 40.

Once audit driver 48 is launched (step 274), loader 46 may quit. In some embodiments, driver loader 46 may remove audit driver 48 from guest VM 32 when audit driver 48 finishes execution, for instance, when the current audit operation is complete. In an alternative embodiment, VM audit engine 40 may perform the cleanup (e.g., remove driver 48 from memory).

Figure 10:
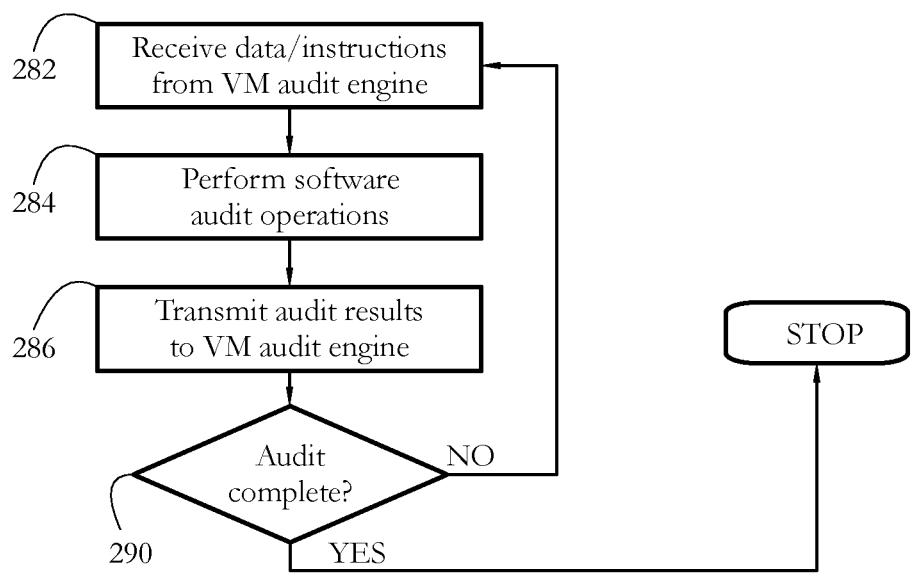
FIG. 10 shows an exemplary sequence of steps performed by the audit driver according to some embodiments of the present invention.

FIG. 10 shows exemplary steps performed by audit driver 48 according to some embodiments of the present invention. Since driver 48 executes within guest VM 32 having its own memory space and execution thread, driver 48 may use all resources available to guest OS 34 to perform an audit of guest VM 32, for instance to enumerate a list of installed applications, to determine various parameter values of the OS, to determine timestamps associated with various software components, to determine resource usage, etc. Such tasks may be carried out using various methods known in the art. For instance, audit driver 48 can enumerate certain registry keys of guest OS 34, the respective keys revealing the identity of an installed application/software package, etc.

Another auditing method invokes an application programming interface (API) exposed by guest OS 34 (such as Windows Management Instrumentation—WMI in Windows®) to obtain various data about installed programs. In yet another example, driver 48 may search for specific files and folders (e.g., Program Files in Windows®) in order to obtain a list of installed programs and updates. Such exemplary methods can be used independently or together. Data gathered during the audit may be transmitted to VM audit engine 40, for instance by writing such data to a predetermined section of memory shared between driver 48 and VM audit engine 40.

In some embodiments, in response to performing the audit and before quitting, audit driver 48 may load and/or launch a security module such as an anti-malware driver. The security module may determine, for instance, whether the audited guest VM comprises malware, and/or may delete or otherwise incapacitate existing malware. Due to the stealthy and dynamic deployment of such a security module, its existence and activities may be relatively difficult to detect and interfere with by malware executing within the respective guest VM.

The exemplary systems and methods described herein allow performing software audits remotely, on a relatively large number of client systems (e.g., a corporate network). Software auditing herein refers to evaluating legitimate software, i.e., software installed and/or configured for execution on the respective client system by a legitimate user (e.g., a system administrator) of the respective client system. An exemplary audit may determine, for instance, which software applications are currently installed on a company's computers. Such information may be used, for instance, to facilitate software licensing, deploy upgrades, prevent employees from installing or using certain software at work (e.g., messaging apps, games), determine employees to use a particular brand or make of software (e.g., Google® Chrome®), etc.

Audit results may be conveniently centralized at a server computer communicatively coupled to the audited client systems. The audits may be carried out automatically, according to a schedule and/or on demand, at the request of a human administrator. In some embodiments of the present invention, audits may be further coupled with computer security activities, such as targeted malware scans/disinfection of selected client systems.

Some embodiments use hardware virtualization technology to increase the safety and reliability of the software audits. To avoid exposing auditing software to malicious human intervention and/or to malware infecting the audited client, some embodiments move client software including the operating system to a virtual machine (VM), and perform parts of the audit from outside the respected virtual machine. Parts of the auditing software may thus execute at the level of a hypervisor, or within a separate, dedicated audit VM executing on the respective client.

By taking full advantage of virtualization, some embodiments of the present invention are also well suited for auditing client systems which execute multiple VMs in parallel, such as server farms and virtual desktop infrastructure (VDI) systems. A single audit engine configured according to some embodiments may audit a plurality of VMs, or all VMs executing on the respective client. Some conventional systems configured to carry out audit operations in virtualized environments perform an audit by analyzing a memory snapshot of the audited VM. Such conventional systems may require that the audited VM be stopped in order to take the respective memory snapshot. In contrast, some embodiments of the present invention do not require stopping the audited VM, since the audit agent may be dropped into a currently executing VM. By not being limited to the information that can be extracted from a memory snapshot, some embodiments may have access to substantially richer audit data from inside the executing VM.

Having auditing software permanently installed within an auditing client may expose such software to malware, which may stop or otherwise incapacitate it. In contrast to such conventional solutions, some embodiments of the present invention dynamically drop an audit agent into the audited machine for the duration of the audit, thus minimizing the computer security risk. Another advantage of not having a permanent audit agent within the audited VM is that such configurations may significantly facilitate administration, deployment, and upgrade of both virtual machines and auditing software. When the auditing solution is independent and not permanently tied to the audited virtual machine, auditing software may be updated independently of VM software. For instance, updates to VM audit engine 40 may be installed without affecting the operation of guest VMs executing on the respective client. In many modern applications of hardware virtualization, such as VDI, virtual machines are typically instantiated and removed dynamically on the client system, often based on a VM image stored locally on the client or received from a VDI server computer. When the audited VM does not have a permanent audit agent, the VM image may be updated or otherwise changed at any time without affecting the audit software.

Performing audit operations from outside an audited VM however poses a difficult technical problem, commonly known in the art as "bridging the semantic gap". While software executing within the audited VM has access to a wealth of information relevant to an audit, software executing outside the respective VM typically only has access to the content of the physical memory and to the current state of the virtual processor of the audited VM. Therefore, untangling the semantics of in-VM software from outside the respective VM may be impossible, or at best may require substantial amounts of computation. To help bridge the semantic gap, some embodiments therefore drop an audit agent within the audited VM. The audit agent may gather information from within the audited VM and communicate such information to components executing outside the audited VM.

It will be clear to a skilled artisan that the above embodiments may be altered in many ways without departing from the scope of the invention. Accordingly, the scope of the invention should be determined by the following claims and their legal equivalents.

What is claimed is:

1. A computer system comprising at least one hardware processor and a memory, the at least one hardware processor configured to execute a set of guest virtual machines (VM) and a VM audit engine, the VM audit engine executing outside of the set of guest VMs and configured to:

in response to receiving an audit request from a remote audit server, insert an audit agent into a target VM of the set of guest VMs, the target VM currently executing on the computer system;

in response to the target VM executing the audit agent, remove the audit agent from the target VM;

in response to removing the audit agent from the target VM, and in response to receiving another audit request from the remote audit server, insert another audit agent into another VM of the set of guest VMs currently executing on the computer system; and in response to the other VM executing the other audit agent, remove the other audit agent from the other VM;

wherein the audit agent is configured to transmit a list of computer programs installed for execution within the target VM to the VM audit engine for further transmission to the audit server;

wherein the other audit agent is configured to transmit another list of computer programs installed for execution within the other VM to the VM audit engine for further transmission to the audit server; and wherein inserting the audit agent comprises writing at least a part of the audit agent to a section of the memory allocated to another software object executing within the target VM.

2. The computer system of claim 1, wherein inserting the audit agent comprises, in preparation for writing the part of the audit agent:

selecting a memory page of the memory according to whether the selected memory page contains a driver of an operating system of the target VM; and locating the section within the selected memory page.

3. The computer system of claim 1, wherein inserting the audit agent comprises, in preparation for writing the part of the audit agent:

intercepting an attempt by an operating system of the target VM to allocate memory to the other software object;

in response to intercepting the attempt, instructing the operating system to allocate memory in excess of an amount indicated by the attempt, an excess amount of memory chosen to accommodate the part of the audit agent; and locating the section within a memory region allocated to the other software object.

4. The computer system of claim 1, wherein the VM audit engine is further configured to:

in preparation for inserting the audit agent, automatically determine a type of operating system executing within the target VM; and in response, selectively formulate an executable code of the audit agent according to the type of operating system.

5. The computer system of claim 1, wherein the audit agent is further configured to:

determine a point in time when at least one computer program of the list was installed; and transmit an indicator of the point in time to the VM audit engine for transmission to the audit server.

6. The computer system of claim 1, wherein the audit agent is further configured to:

determine a version of at least one computer program of the list; and transmit an indicator of the version to the VM audit engine for transmission to the audit server.

7. The computer system of claim 1, wherein the audit agent is further configured to:

generate a second list of computer programs, wherein all members of the second list are currently loaded in a memory space of the target VM; and transmit the second list to the VM audit engine for transmission to the audit server.

8. The computer system of claim 1, wherein the audit agent is further configured to:

determine an amount a hardware resource currently used by the target VM, the hardware resource selected from a group consisting of a processing capacity of the at least one hardware processor, and a storage capacity of a non-volatile storage device of the computer system; and transmit an indicator of the amount to the VM audit engine for transmission to the audit server.

9. A method of auditing a computer system, the method comprising employing at least one hardware processor of the computer system to execute a virtual machine (VM) audit engine outside of a set of guest VMs executing on the computer system, wherein executing the VM audit engine comprises:

in response to receiving an audit request from a remote audit server, inserting an audit agent into a target VM of the set of guest VMs currently executing on the computer system;

in response to the target VM executing the audit agent, removing the audit agent from the target VM;

in response to removing the audit agent from the target VM, and in response to receiving another audit request from the remote audit server, inserting another audit agent into another VM of the set of guest VMs currently executing on the computer system; and in response to the other VM executing the other audit agent, removing the other audit agent from the other VM;

wherein the audit agent is configured to transmit a list of computer programs installed for execution within the target VM to the VM audit engine for further transmission to the audit server;

wherein the other audit agent is configured to transmit another list of computer programs installed for execution within the other VM to the VM audit engine for further transmission to the audit server; and wherein inserting the audit agent comprises writing at least a part of the audit agent to a section of a memory of the computer system, the section allocated to another software object executing within the target VM.

10. The method of claim 9, wherein inserting the audit agent comprises, in preparation for writing the part of the audit agent:

selecting a memory page of the memory according to whether the selected memory page contains a driver of an operating system of the target VM; and locating the section within the selected memory page.

11. The method of claim 9, wherein inserting the audit agent comprises, in preparation for writing the part of the audit agent:

intercepting an attempt by an operating system of the target VM to allocate memory to the other software object;

in response to intercepting the attempt, instructing the operating system to allocate memory in excess of an amount indicated by the attempt, an excess amount of memory chosen to accommodate the part of the audit agent; and locating the section within a memory region allocated to the other software object.

12. The method of claim 9, wherein executing the VM audit engine further comprises:

in preparation for inserting the audit agent, automatically determining a type of operating system executing within the target VM; and in response, selectively formulating an executable code of the audit agent according to the type of operating system.

13. The method of claim 9, wherein the audit agent is further configured to:

determine a point in time when at least one computer program of the list was installed; and transmit an indicator of the point in time to the VM audit engine for transmission to the audit server.

14. The method of claim 9, wherein the audit agent is further configured to:
determine a version of at least one computer program of the list; and
transmit an indicator of the version to the VM audit engine for transmission to the audit server.

15. The method of claim 9, wherein the audit agent is further configured to:
generate a second list of computer programs, wherein all members of the second list are currently loaded in a memory space of the target VM; and
transmit the second list to the VM audit engine for transmission to the audit server.

16. The method of claim 9, wherein the audit agent is further configured to:
determine an amount a hardware resource currently used by the target VM, the hardware resource selected from a group consisting of a processing capacity of the at least one hardware processor, and a storage capacity of a non-volatile storage device of the computer system; and
transmit an indicator of the amount to the VM audit engine for transmission to the audit server.

17. A non-transitory computer-readable medium storing instructions which, when executed by at least one hardware processor of a computer system, cause the computer system to form a virtual machine (VM) audit engine, the VM audit engine executing outside a set of guest VMs exposed on the computer system, the VM audit engine configured to:
in response to receiving an audit request from a remote audit server, insert an audit agent into a target VM of the set of guest VMs currently executing on the computer system;
in response to the target VM executing the audit agent, remove the audit agent from the target VM;
in response to removing the audit agent from the target VM, and in response to receiving another audit request from the remote audit server, insert another audit agent into another VM of the set of guest VMs currently executing on the computer system; and
in response to the other VM executing the other audit agent, remove the other audit agent from the other VM;
wherein the audit agent is configured to transmit a list of computer programs installed for execution within the target VM to the VM audit engine for further transmission to the audit server;
wherein the other audit agent is configured to transmit another list of computer programs installed for execution within the other VM to the VM audit engine for further transmission to the audit server; and
wherein inserting the audit agent comprises writing at least a part of the audit agent to a section of a memory of the computer system, the section allocated to another software object executing within the target VM.

* * * * *